US012607703B2

(12) United States Patent
Vivathana et al.

(10) Patent No.: US 12,607,703 B2
(45) Date of Patent: Apr. 21, 2026

(54) MOBILE ENTITY MANAGEMENT

(71) Applicant: OnPoint Systems, LLC, Manchester, NH (US)

(72) Inventors: Xinnakone Vivathana, Stratham, NH (US); Kenneth J. Bazydola, Maynard, MA (US); Eric G. Cusson, Bedford, NH (US)

(73) Assignee: OnPoint Systems, LLC, Manchester, NH (US)

( * ) Notice: Subject to any disclaimer, the term of this patent is extended or adjusted under 35 U.S.C. 154(b) by 306 days.

(21) Appl. No.: 18/592,920

(22) Filed: Mar. 1, 2024

(65) Prior Publication Data

US 2024/0295624 A1 Sep. 5, 2024

Related U.S. Application Data

(60) Provisional application No. 63/449,509, filed on Mar. 2, 2023.

(51) Int. Cl.
G01S 5/02 (2010.01)

(52) U.S. Cl.
CPC ............ G01S 5/021 (2013.01); G01S 5/0264 (2020.05)

(58) Field of Classification Search
CPC ... G05D 1/0088; G01S 13/881; G01S 13/931; Y10S 901/01; H04W 4/021
USPC ........ 342/27–28, 450–465; 455/404.2, 456.1
See application file for complete search history.

(56) References Cited

U.S. PATENT DOCUMENTS

| | | | |
|---|---|---|---|
| 5,225,842 A | 7/1993 | Brown et al. | |
| 6,073,589 A * | 6/2000 | Curen ................. | A01K 15/021 |
| | | | 340/573.3 |
| 8,188,917 B2 | 5/2012 | Gronemeyer et al. | |
| 8,731,827 B2 * | 5/2014 | Park ..................... | G01C 21/206 |
| | | | 701/500 |
| 8,935,093 B2 | 1/2015 | Chansarkar | |
| 9,546,875 B2 * | 1/2017 | Lin ....................... | H04W 8/005 |
| 9,693,536 B1 * | 7/2017 | Dana .................... | A01K 15/023 |
| 9,860,701 B1 * | 1/2018 | Fang ..................... | H04W 4/80 |
| 9,905,134 B2 * | 2/2018 | Kube ........................ | G08G 5/59 |
| 10,527,430 B2 * | 1/2020 | Do ...................... | G01S 5/02525 |
| 10,539,424 B2 * | 1/2020 | Roy ....................... | H04W 4/20 |

(Continued)

FOREIGN PATENT DOCUMENTS

WO      2022192251 A1      9/2022

OTHER PUBLICATIONS

Sturza, M et al., "Intgrated GPS/GLONASS for Reliable Receiver Autonomous Intergrity Monitoring (RAIM)", presented at: The Institute of Navigation, Atlantic City, New Jersey, Jun. 1990 (6 pages).

(Continued)

*Primary Examiner* — Michael W Justice
(74) *Attorney, Agent, or Firm* — Nutter McClennen & Fish LLP

(57) ABSTRACT

A method for managing a moving entity may include forming an outer zone including a building, forming an inner zone within the outer zone, monitoring a signal from the moving entity, the signal including an identity of the moving entity and a signal strength, monitoring a location of the moving entity, and correcting the moving entity based on the signal strength, the identity, and a location of the moving entity relative to the outer and inner zones and the building.

22 Claims, 7 Drawing Sheets

Building Zones Diagram

(56) References Cited

U.S. PATENT DOCUMENTS

| | | | | |
|---|---|---|---|---|
| 10,571,547 B2* | 2/2020 | Oh | G01S 5/0242 |
| 10,652,693 B2* | 5/2020 | Jadav | G01C 21/3629 |
| 10,726,712 B2* | 7/2020 | Locke | G05D 1/0274 |
| 10,852,751 B2* | 12/2020 | Scanu | G07C 9/20 |
| 11,067,664 B2* | 7/2021 | Oh | G01S 1/024 |
| 11,156,465 B2* | 10/2021 | Roy | G01C 21/206 |
| 11,184,772 B2* | 11/2021 | Douglas | G06Q 20/3224 |
| 11,222,542 B2* | 1/2022 | Lund | H04W 4/44 |
| 11,274,936 B2* | 3/2022 | Ostafew | G05D 1/0088 |
| 11,310,624 B2* | 4/2022 | Mukherjee-Roy | H04W 4/33 |
| 11,445,152 B2* | 9/2022 | Deyle | G01C 21/20 |
| 11,460,849 B2* | 10/2022 | Deyle | G05D 1/0219 |
| 11,463,839 B2* | 10/2022 | Jadav | G06F 40/40 |
| 11,531,343 B1* | 12/2022 | Kitchens | G05D 1/0231 |
| 11,551,549 B2* | 1/2023 | Kitahama | G08G 1/202 |
| 11,570,623 B2* | 1/2023 | Douglas | H04W 4/025 |
| 11,618,164 B2* | 4/2023 | Park | B25J 9/1666 |
| | | | 700/255 |
| 11,653,172 B2* | 5/2023 | Volotinen | H04W 4/029 |
| | | | 455/456.1 |
| 11,741,842 B2* | 8/2023 | Jäger | G08G 5/53 |
| | | | 701/3 |
| 11,800,321 B2* | 10/2023 | Iwata | G08G 1/012 |
| 11,974,200 B2* | 4/2024 | Deng | H04W 4/80 |
| 12,233,533 B2* | 2/2025 | Nickolaou | G06Q 10/08 |
| 12,416,500 B1* | 9/2025 | O'Brien | G08B 7/062 |
| 2008/0168949 A1* | 7/2008 | Belcher | A01K 15/023 |
| | | | 119/721 |
| 2008/0278309 A1* | 11/2008 | Troxler | A01K 15/023 |
| | | | 340/539.1 |
| 2011/0205115 A1 | 8/2011 | Gronemeyer et al. | |
| 2013/0151139 A1* | 6/2013 | Park | G01C 21/188 |
| | | | 701/410 |
| 2016/0341556 A1* | 11/2016 | Lin | G01C 21/206 |
| 2017/0025021 A1* | 1/2017 | Song | G08G 5/55 |
| 2017/0265432 A1 | 9/2017 | Anderton et al. | |
| 2017/0336212 A1* | 11/2017 | Zhao | G01C 21/20 |
| 2018/0007508 A1* | 1/2018 | Fang | H04W 4/33 |
| 2018/0067187 A1* | 3/2018 | Oh | H04W 64/00 |
| 2018/0087909 A1* | 3/2018 | Do | G01C 21/206 |
| 2019/0010750 A1* | 1/2019 | Scanu | G07C 9/20 |
| 2019/0041225 A1* | 2/2019 | Winkle | G01C 21/3453 |
| 2019/0048640 A1* | 2/2019 | Lickfelt | E05F 15/40 |
| 2019/0066488 A1* | 2/2019 | Locke | G05D 1/0276 |
| 2019/0139421 A1* | 5/2019 | Nilsson | G08G 5/22 |
| 2019/0281794 A1* | 9/2019 | Ehrman | F41H 13/0018 |
| 2020/0050206 A1* | 2/2020 | Deyle | G01S 13/876 |
| 2020/0053324 A1* | 2/2020 | Deyle | G01C 21/20 |
| 2020/0084572 A1* | 3/2020 | Jadav | H04W 4/024 |
| 2020/0141736 A1* | 5/2020 | Roy | G01C 21/206 |
| 2020/0150213 A1* | 5/2020 | Oh | G01S 5/14 |
| 2020/0154234 A1* | 5/2020 | Mukherjee-Roy | G06F 40/40 |
| 2020/0154235 A1* | 5/2020 | Jadav | H04W 4/023 |
| 2020/0154278 A1* | 5/2020 | Douglas | H04W 12/08 |
| 2020/0230806 A1* | 7/2020 | Choi | B25J 9/0084 |
| 2021/0056852 A1* | 2/2021 | Lund | G08G 1/0141 |
| 2021/0107156 A1* | 4/2021 | Park | B25J 9/1666 |
| 2021/0136528 A1* | 5/2021 | Iwata | G08B 25/10 |
| 2021/0148726 A1* | 5/2021 | Ostafew | G05D 1/227 |
| 2022/0005360 A1* | 1/2022 | Kube | G05D 1/0011 |
| 2022/0018662 A1* | 1/2022 | Roy | G01C 21/206 |
| 2022/0030432 A1* | 1/2022 | Douglas | H04W 4/025 |
| 2022/0032954 A1* | 2/2022 | Xu | G01C 21/3889 |
| 2022/0092681 A1* | 3/2022 | Haapoja | G01C 21/206 |
| 2022/0103983 A1* | 3/2022 | Deng | G01S 5/017 |
| 2022/0167116 A1* | 5/2022 | Volotinen | H04W 4/029 |
| 2023/0031185 A1* | 2/2023 | Jäger | G08G 5/53 |
| 2023/0214909 A1* | 7/2023 | Haapoja | G01C 21/206 |
| | | | 705/26.1 |
| 2024/0196360 A1* | 6/2024 | Kucera | H04W 64/00 |
| 2024/0246243 A1* | 7/2024 | Nickolaou | B25J 9/1602 |
| 2024/0419192 A1* | 12/2024 | Kuc | G05D 1/221 |
| 2025/0126449 A1* | 4/2025 | Bisht | H04W 4/06 |

OTHER PUBLICATIONS

[No Author Listed] "RXM-GPS-SR: SR Series GPS Receiver Module Data Guide", Linx Technologies, Manual/Product information, dated Nov. 22, 2010. (15 pages).

[No Author Listed] u-blox 7 Receiver Description—Including Protocol Specification V14. Manual/Product Description, Feb. 2013 (209 pages).

Sturza, M et al. "Intergrated GPS/AHRS: A Synergistic Mix", IEEE 1984 National Aerospace and Electronics Conference Proceedings, Dayton, Ohio, May 1984 (10 pages).

* cited by examiner

Fig. 1 System Block Diagram
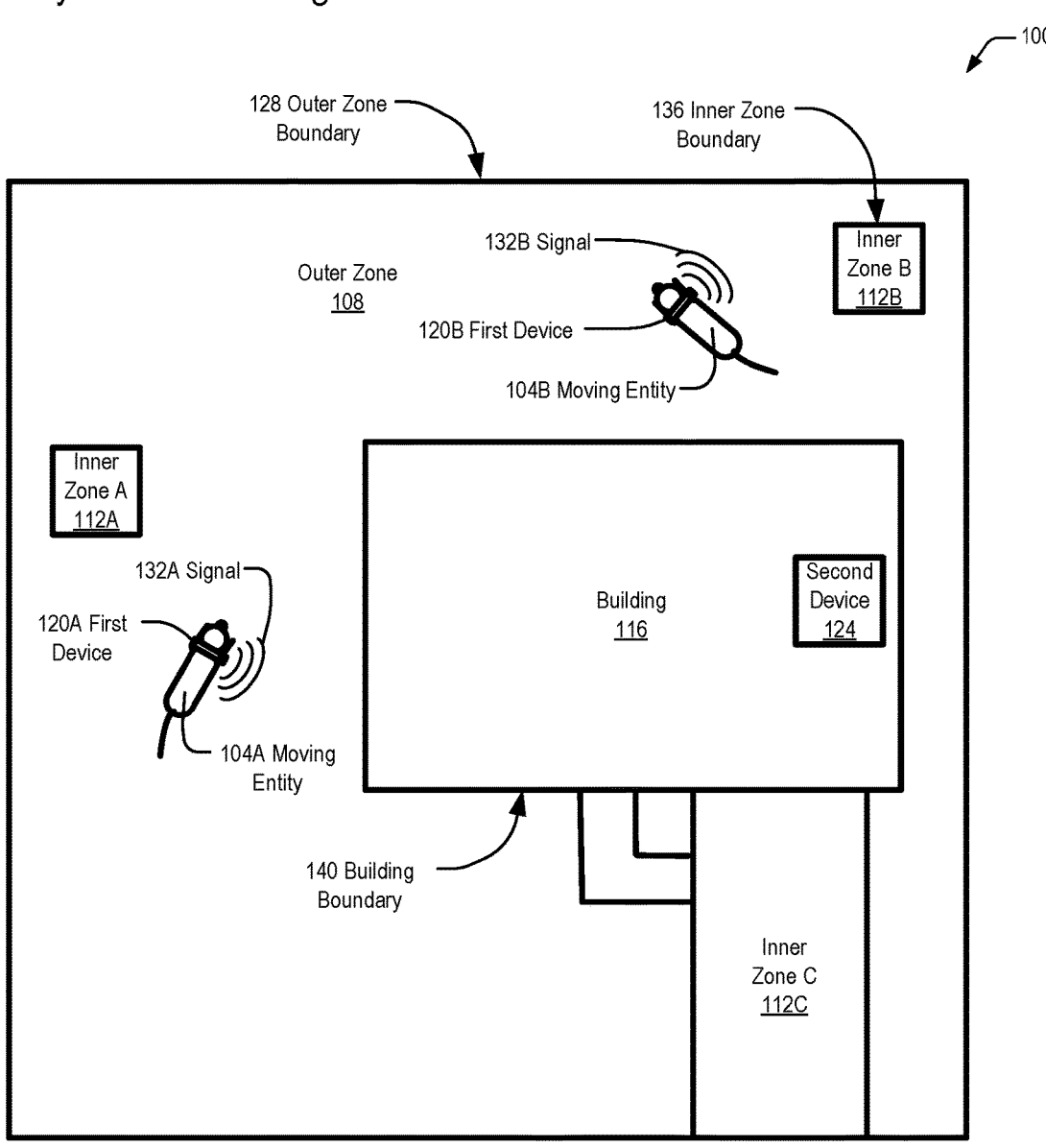

Fig. 2  Building Zones Diagram
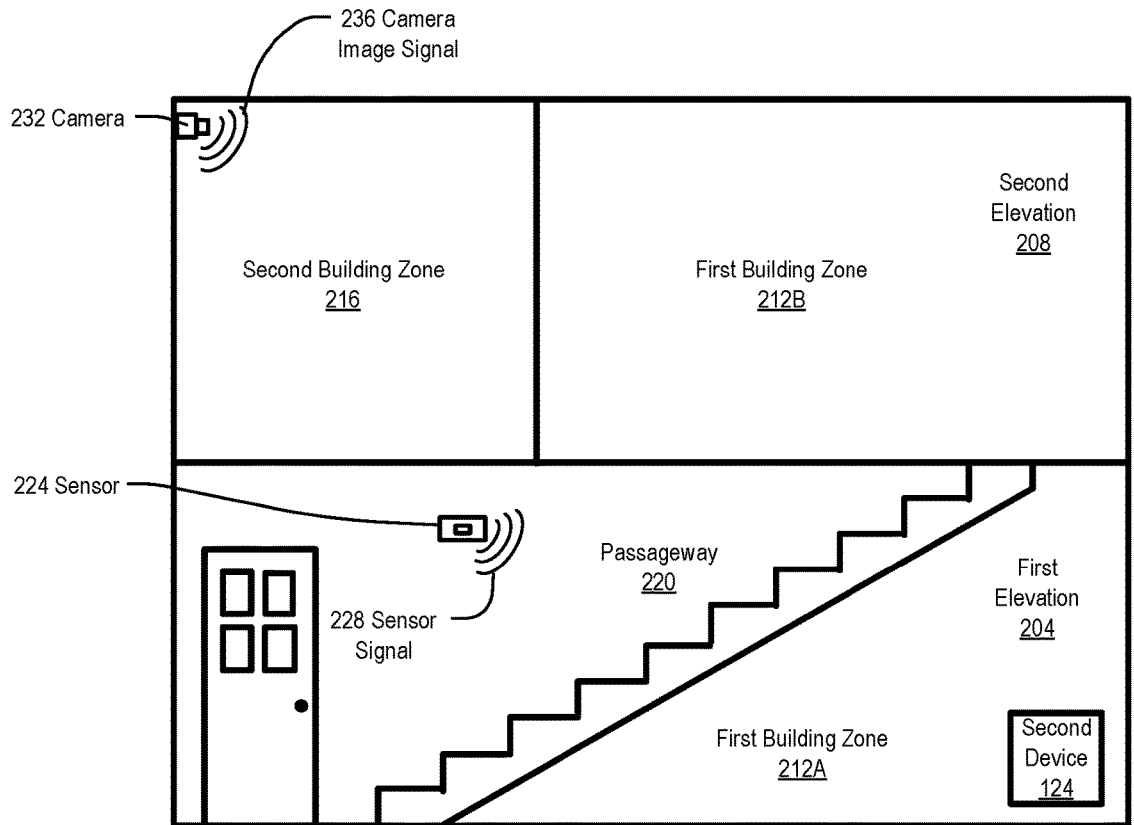

Fig. 3 First Device Block Diagram

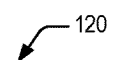

120

344 Current Coordinates

360 On/Off

364 Reset

368 Program Boundary

372 Program
Warning/Correction

| GNSS Receiver 320 | Display 328 | Control/ Warning Transducer 324 | → To Mobile Entity 104 |

348 Status Messages, Menus, and Selections

User Controls
316

Controller
304

352 Notifications

356 Corrections and Warnings

RF Transceiver
312

To/From Wireless
Network

| Application 332 | Identity 336 | Building Boundaries 140 |
| Coordinates Log 340 | Outer Zone Boundaries 128 | Inner Zone Boundaries 136 |

Memory 308

Fig. 4 Second Device Block Diagram
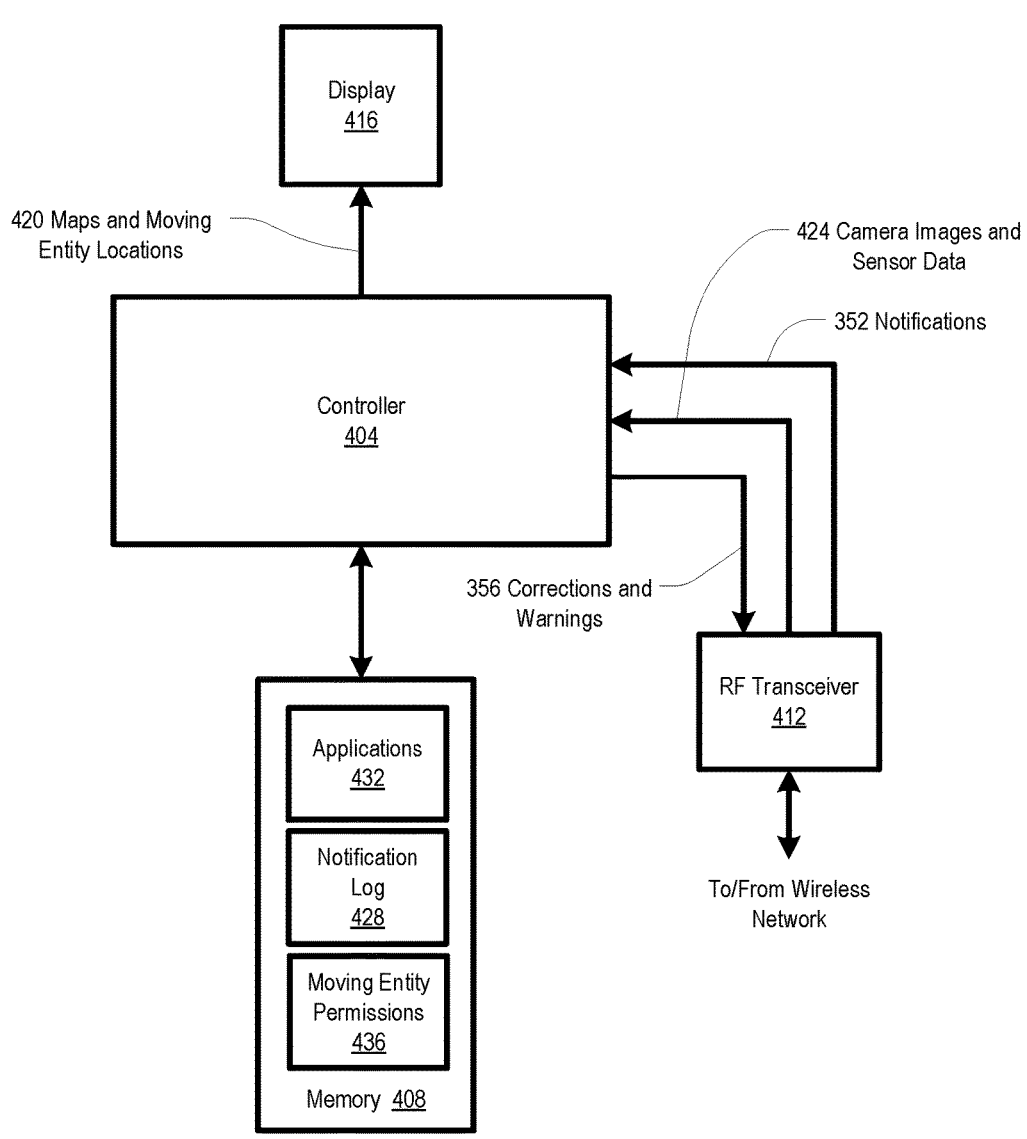

Fig. 5  Moving Entity Permissions

~436

| Moving Entity Identity 104 | Outer Zone OK 504 | Inner Zone A OK 508 | Inner Zone B OK 512 | Inner Zone C OK 516 | Building Zones OK 520 | | |
|---|---|---|---|---|---|---|---|
| | | | | | Zone 1 524 | Zone 2 528 | Zone 3 532 |
| 104A | Yes | Yes | No | No | Yes | Yes | Yes |
| 104B | Yes | No | Yes | No | Yes | Yes | No |
| 104C | Yes | No | No | No | No | No | No |
| 104D | Yes | No | No | Yes | Yes | No | No |

Fig. 6  Moving Entity Configuration Process
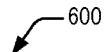
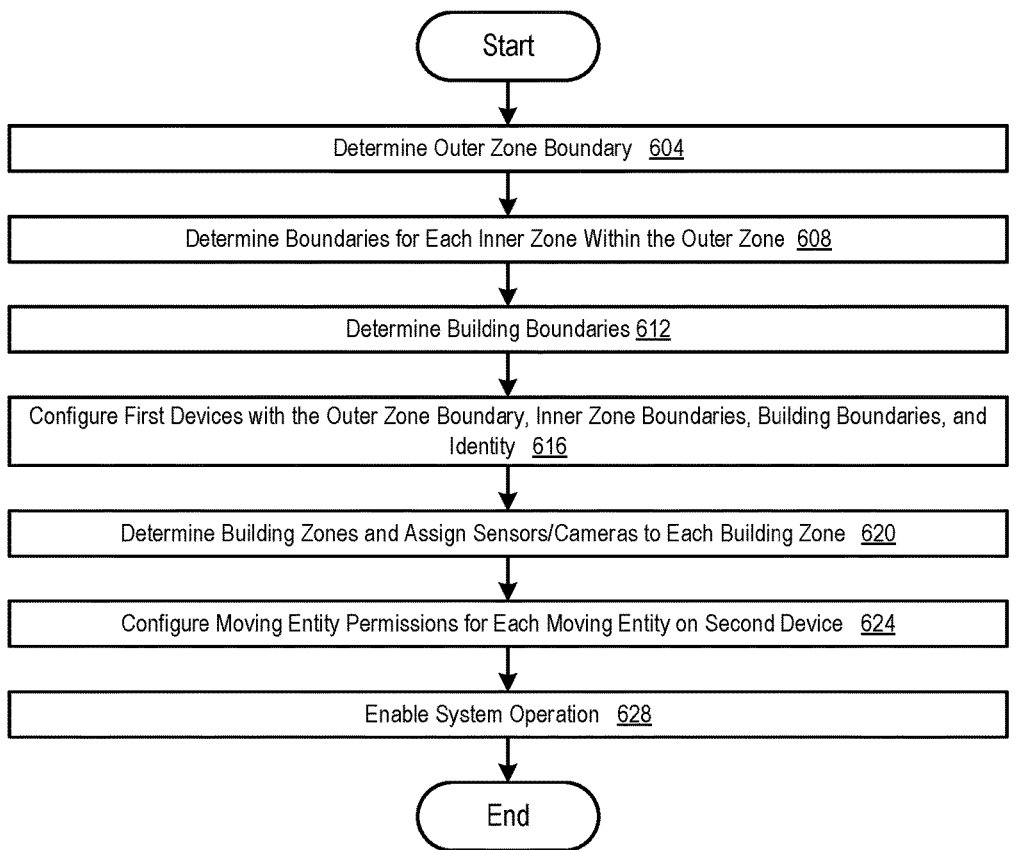

Fig. 7  Moving Entity Management Process
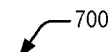
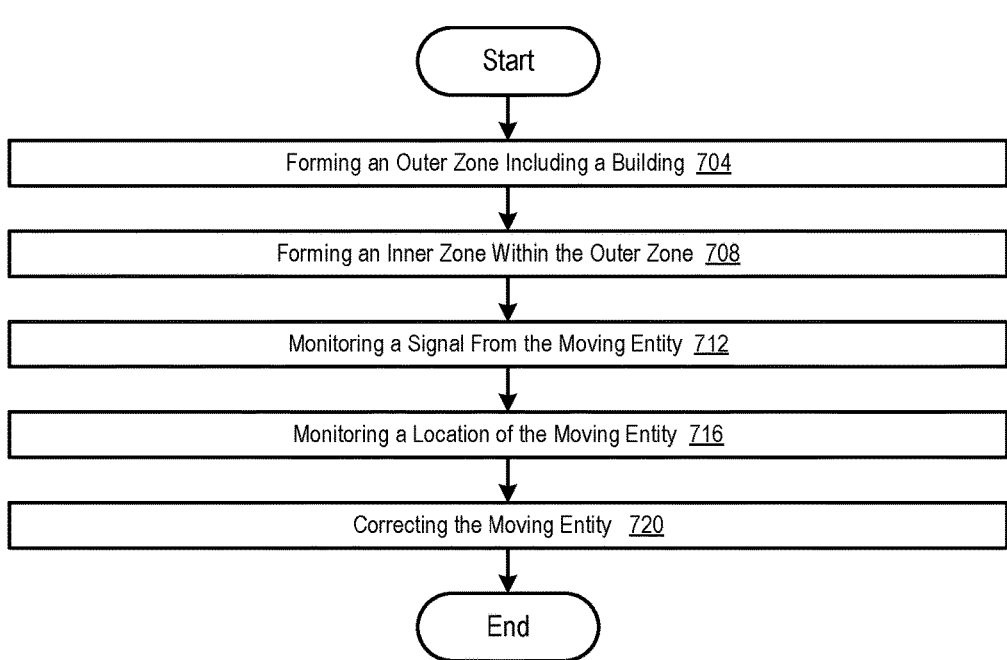

MOBILE ENTITY MANAGEMENT

CROSS-REFERENCE TO RELATED APPLICATIONS

This patent application claims priority from provisional U.S. provisional patent application No. 63/449,509, filed Mar. 2, 2023 entitled, METHOD AND APPARATUS FOR MANAGING CERTAIN ANIMALS and naming Xinnakone Vivathana, Kenneth Bazydola, and Eric Cusson as the inventors, the disclosure of which is incorporated herein, in its entirety, by reference.

FIELD

Illustrative embodiments of the invention generally relate to tracking moving objects and, more particularly, various embodiments of the invention relate to managing animal movement within predefined areas.

BACKGROUND

With the rise in home pet ownership, specifically dogs, it is increasingly important that they be contained in a safe environment while allowing them to roam free to maintain health and happiness. There are several different ways to help keep an otherwise unconstrained animal (e.g., a dog) contained to meet this ever-growing requirement. These can be anything from a traditional wooden fence, an electric above ground fence, and a buried wired fence to wireless fencing and geofencing. The former three fence types have many limitations when it comes to fencing in an area. For example, they may be costly to install and maintain because they suffer from the weather, wind, and sun elements they are exposed to. Furthermore, animals (in this case dogs) are very intelligent animals—meaning they learn the shortcomings of physical fencing. They may jump over a fence, break through a fence, or wait until the fence malfunctions before attempting to make an escape. Unfortunately, with physical traditional fences, the owner often is not notified that the animal has escaped until it is too late. With buried wire fences, the same is true—the local environment can erode, if not destroy the fence, and allows animals to escape.

SUMMARY OF VARIOUS EMBODIMENTS

In accordance with one embodiment of the invention, a method for managing a moving entity may include forming an outer zone including a building, forming an inner zone within the outer zone, monitoring a signal from the moving entity, the signal including an identity of the moving entity and a signal strength, monitoring a location of the moving entity, and correcting the moving entity based on the signal strength, the identity, and a location of the moving entity relative to the outer and inner zones and the building.

In accordance with other embodiments, correcting the moving entity based on the location of the moving entity relative to the building includes determining the moving entity is within the building, determining an elevation of the moving entity, and providing the correction to the moving entity in response to a combination of the elevation and identity of the moving entity are prohibited.

In accordance with other embodiments, the method includes removing the correction from the moving entity in response to the combination of the elevation and the identity are not prohibited.

In accordance with other embodiments, the method includes determining the location of the moving entity relative to the outer and inner zones based on a signal received by the moving entity and determining the location of the moving entity relative to the building at least in part from one or more cameras or sensors within the building. In one embodiment, the signal may be a Global Navigation Satellite System (GNSS), Global Positioning System (GPS), or any other satellite-based signal.

In accordance with other embodiments, the inner zone includes a first and a second inner zone and the moving entity includes a first and a second moving entity differentiated by identity, where the first moving entity is allowed in the first inner zone but not the second inner zone and the second moving entity is allowed in the second inner zone but not the first inner zone. The method further includes determining the identities and locations of the first and the second moving entities, correcting the first moving entity in response to the first moving entity is in the second inner zone, and correcting the second moving entity in response to the second moving entity is in the first inner zone.

In accordance with other embodiments, the building includes a first and a second building zone, where the moving entity is allowed in the first building zone but not the second building zone, The method further includes correcting the moving entity in response to the moving entity is in the second building zone.

In accordance with other embodiments, the building includes a first elevation and a second elevation, where the second elevation includes a first and a second building zone and the moving entity is allowed on the first elevation or in the first building zone but not on the second elevation and in the second building zone. The method further includes determining an elevation of the moving entity within the building and correcting the moving entity in response to determining the moving entity is on the second elevation and in the second building zone.

In accordance with other embodiments, the building includes a passageway connecting the first and second elevations. The method further includes determining the moving entity has entered the passageway from the first elevation, and in response providing a warning to the moving entity, where the warning has a lower intensity than correcting the moving entity.

In accordance with another embodiment of the invention, correcting the moving entity is based on the identity of the moving entity.

In accordance with another embodiment of the invention, the signal strength is based on a carrier-to-noise ratio of the signal.

In accordance with another embodiment of the invention, one or more boundaries of the building cross a boundary of the outer zone or the inner zone, where in response to the moving entity is within the building the method further includes correcting the moving entity based on the signal strength, the identity, and the location of the moving entity relative to the building, but not the outer and inner zones.

In accordance with another embodiment of the invention, a system includes a first device and a second device. The first device may be associated with a moving entity and includes a first memory device, a Global Navigation Satellite System (GNSS) receiver, a first Radio Frequency (RF) transceiver, and a first processor, coupled to the first memory device, the GNSS receiver, and the RF transceiver. The first memory device is configured to store an identity associated with the first device, boundaries of an outer zone, boundaries of an inner zone within the outer zone, and boundaries of a building within the outer zone. The GNSS receiver is configured to produce current coordinates of the first device. The first processor is configured to transmit notifications through the RF transceiver in response to the first device crosses one or more boundaries of the outer zone, the inner zone, or the building. The notifications include the identity, a location of the first device, and an indication of the one or more boundaries crossed. The second device may be associated with the building, and includes a second memory device, a second RF transceiver, and a second processor coupled to the second memory device and the second RF transceiver. The second RF transceiver is configured to receive the notifications from the first RF transceiver. The second processor is configured to determine a signal strength of the notifications, extract the identity, the location, and the indication of the one or more boundaries crossed from the notifications and correct the moving entity based on the signal strength, the identity, the location, and the indication of the one or more boundaries crossed.

BRIEF DESCRIPTION OF THE DRAWINGS

Those skilled in the art should more fully appreciate advantages of various embodiments of the invention from the following "Description of Illustrative Embodiments," discussed with reference to the drawings summarized immediately below.

FIG. 1 schematically shows a system block diagram in accordance with illustrative embodiments of the invention.

FIG. 2 schematically shows a building zones diagram in accordance with illustrative embodiments of the invention.

FIG. 3 schematically shows a first device block diagram in accordance with illustrative embodiments of the invention.

FIG. 4 schematically shows a second device block diagram in accordance with illustrative embodiments of the invention.

FIG. 5 schematically shows moving entity permissions diagram in accordance with illustrative embodiments of the invention.

FIG. 6 shows a flowchart of a moving entity configuration process in accordance with illustrative embodiments of the invention.

FIG. 7 shows a flowchart of a moving entity management process in accordance with illustrative embodiments of the invention.

DESCRIPTION OF ILLUSTRATIVE EMBODIMENTS

In illustrative embodiments, a mobile entity management process provides a flexible environment to control and report moving entity movements within horizontal and vertical (e.g., elevation) predefined areas. Moving entities may include various domesticated or non-domesticated animals, humans, or various forms of mobile machines including forms of transportation. The mobile entity management process can independently manage different moving entity types or different levels of animal health or training by identity. This allows different area permissions to be established for each moving entity as well as different types of moving entities. By combining conventional horizontal position tracking with vertical position tracking, such as within one or more buildings, a comprehensive moving entity position management system is established.

FIG. 1 schematically shows a system block diagram 100 in accordance with illustrative embodiments of the invention.

tion. As shown in FIG. 1, an area may include an outer zone 108 or containment area, one or more inner zones 112, and one or more buildings 116 or home zones. The outer zone 108 may be defined by an outer zone boundary 128, which may have any shape, symmetry, or non-symmetry. The outer zone 108 may commonly represent a property boundary or containment zone, such as associated with a home, a business, or a government entity. Three inner zones 112 are shown in FIG. 1 and are identified as inner zone A 112A, inner zone B 112B, and inner zone C 112C. Inner zones 112 may be similar or different sizes and shapes from each other, depending on the needs of moving entities 104 associated with each inner zone 112. In one embodiment, one or more inner zones 112 may reflect dangerous brush, ponds, streets, driveways, or other areas not suitable or safe for the moving entity 104.

Each inner zone 112 may have a corresponding inner zone boundary 136 and each building 116 may have a corresponding building boundary 140. Although not specifically shown in FIG. 1, it is understood that inner zone A 112A has a corresponding inner zone boundary 136A, inner zone B 112B has a corresponding inner zone boundary 136B, and inner zone C 112C has a corresponding inner zone boundary 136C.

FIG. 1 illustrates two moving entities 104, identified as moving entity 104A and moving entity 104B. Any number of moving entities 104 may be present, and the number of moving entities 104 may change over time. Moving entities 104 may be animals, humans, or machines such as vehicles or mobile robots. Mobile entity management has several beneficial use cases that may be applied to each type of mobile entity 104.

For example, in the case of animals, mobile entities 104 may include a number of dogs. Each dog may have its own inner zone 112 that may include, for example, a doghouse or sleeping area, a food bowl, and a water bowl. By configuring each dog's respective inner zone 112 (i.e., mobile entity 104A associated with inner zone A 112A and mobile entity 104B associated with inner zone 112B), it may be possible to prevent a given dog from entering a different dog's area to, for example, eat the other dog's food. Also in the case of animals, moving entities 104 may be divided into animals that are domesticated (e.g., cats and dogs) versus animals that are not domesticated (e.g., horses, alpacas, goats, etc.). In this case, the inner zone 112 dedicated to the non-domesticated animals may include a large portion (not shown) of the outer zone 108 for grazing and animal stables. The inner zone(s) 112 dedicated to the domesticated animals may include a number of small areas as shown in FIG. 1 that are outside the inner zone 112 dedicated to the non-domesticated animals. In one embodiment, one inner zone 112 may be located within a different inner zone 112. The system may be additionally configured to allow the domesticated animals limited or full access to the building 116 (e.g., a home or kennel), while the non-domesticated animals may not have building 116 access permissions. This is explained in more detail with respect to FIG. 5. In some embodiments, certain inner zones 112 may be off-limits to all moving entities 104. For example, FIG. 1 illustrates a driveway at inner zone 112C that may be prohibited to all moving entities 104. This may beneficially provide increased safety to moving entities 104, for example, when a vehicle is backing out of a garage of the building 116 and a driver of the vehicle may not see a moving entity 104 such as a cat or dog.

Another example of FIG. 1 may be described for human moving entities 104 in a case of prison population management. Prisons may include multiple types of prisoners that require different recreational privileges. Inner zones 112 may be configured to segregate areas of the outer zone 108 and areas of the prison (building 116), including cell blocks, cafeterias, etc. of prison building(s) 116 from the different prison populations.

Another example of FIG. 1 may be described for machine moving entities 104, such as automobiles and trucks. Many traffic areas include segregated areas organized by traffic direction (e.g., one-way or within buildings 116 such as parking garages), construction traffic only, emergency vehicle restricted access, and the like. In many cases, the identity and location of a vehicular moving entity 104 may determine whether corrections are required to discourage or prevent a vehicular moving entity 104 from entering an unsafe area. This may be performed by defining various inner zones 112 within a city or town and segregating areas within buildings 116, as will be further discussed herein.

Each moving entity 104 may have a corresponding first device 120 attached or coupled to the moving entity 104. For example, an animal may wear a suitable stimulus collar, a human may wear an ankle bracelet, a machine may have an included circuit, etc. FIG. 1 illustrates first device 120A coupled to moving entity 104A and first device 120B coupled to moving entity 104B. First devices 120 are described in more detail with respect to FIG. 3, and each first device 120 emits a radio frequency (RF) signal 132. First device 120A emits signal 132A and first device 120B emits signal 132B. Each signal 132 may have an associated signal strength as determined by a receiving second device 124. The signal strength may provide additional information to positively determine moving entity 104 location, as discussed herein. In one embodiment, the signal strength may be based on a carrier-to-noise ration of the signal or notification provided by the signal.

Boundaries 128, 136, and/or 140 may be defined several ways. For example, first devices 120 may include a user interface that allows a boundary 128, 136, or 140 to be defined. The user interface may include any type of controls, control activation sequence, and indicators known in the art to start defining a boundary, end defining a boundary, changing a direction of a boundary, resetting a boundary, or storing a boundary. Boundaries 128, 136, and/or 140 may also be defined using mapping software running on the second device 124 or another device.

In illustrative embodiments, the system 100 may use two variables to manage moving entity 104 correction in a virtually fenced-in area with internal zones 112 that may be off limits. To that end, such embodiments may use positional information and first device 120 signal amplitude data to make appropriate corrections.

The system 100 may include one or more second devices 124 that receive signals 132 from moving entities 104 and transmit other signals to moving entities 104, as discussed herein. FIG. 1 illustrates the first device 120A of moving entity 104A transmitting signal 132A to the second device 124 and the second device 120B of moving entity 104B transmitting signal 132B to the second device 124. The second device(s) 124 are described in more detail with respect to FIG. 4.

FIG. 2 schematically shows a building zones diagram in accordance with illustrative embodiments of the invention. As shown in FIG. 2, a building 116 may have one elevation (e.g., floor) 204 or multiple elevations 204, 208, etc. FIG. 2 illustrates a building with two elevations 204, 208 with a passageway 220 providing a means to travel between the two elevations 204, 208. The passageway 220 may include one or more sets of stairs as shown, or be another means of traveling between elevations 204, 208 such as an elevator or escalator.

Each elevation 204, 208 of a building may have one or more zones 212, 216 defined on each elevation 204, 208. In some embodiments, a zone may occupy multiple elevations of a building 116. In the example of FIG. 2, a first building zone 212A may be defined as an entire first elevation 204 and a portion 212B of a second elevation 208. The second elevation 208 is also shown to include a second building zone 216. Any number of building zones may be defined for each elevation. The example presented in FIG. 5 describes a use case for utilizing vertical zones of elevations to more thoroughly manage moving entities 104.

Buildings 116 may have any shape and configuration. Multi-story buildings 116 routinely (but not always) include stacked elevations within a same building 116 outline. Satellite-based location and position determination and tracking systems (e.g., GPS, GNSS, etc.) provide useful resolution to determine X-Y positioning to a small number of meters/yards but are not able to determine vertical positioning or building 116 elevation determination. For this reason, another means must be used to determine a current elevation within a building 116 for moving entities 104.

Buildings 116 may include various sensors 224 or cameras 232 for tracking moving entities 104. FIG. 2 illustrates a sensor 224 on the first elevation 204 providing a sensor signal 228 to the second device 124 and a camera 232 providing a camera image signal 236 to the second device 124. A given elevation 204, 208 or passageway 220 may include any number and locations of sensors 224 and/or cameras 232, as long as moving entities 104 may be accurately detected and reported within elevations 204, 208 and zones 212, 216 of each building 116.

Sensors 224 may include various types of sensors, including Radar sensors, Lidar sensors, optical beams, weight sensors, pressure sensors, thermal sensors, and the like. In some embodiments, different sensors may provide different forms of data to the second device 124 that applications executing on the second device 124 may use different or complementary data in combination to determine the specific location of a moving entity 104 within a building 116. For example, a radar sensor 224 may detect a moving entity 104 generally within a first elevation 204, but a positive notification from pressure sensors 224 on a group of stairs in an upward sequence may confirm the moving entity 104 is in the passageway 220 and traveling from the first elevation 204 to the second elevation 208.

Cameras 232 may capture either single frames or video and transmit a camera image signal 236 to the second device 124. The second device 124 may execute one or more image processing applications to detect and identify objects within camera images and/or video. For example, such an application may be able to differentiate a dog from a small child and determine a distance from the camera 232. This may determine which zone within an elevation the moving entity 104 is currently in and a direction of travel, such as a dog on the second elevation 208 traveling from the first building zone 212B to the second building zone 216.

Although the second device 124 is shown on the first elevation 204 of the building 116, second devices 124 may be located anywhere, including in a networked cloud, within the outer zone 108, or outside the outer zone 108 at another location. In addition to reviewing notifications (i.e., within signals 132) from first devices 120, the second device 124 also receives sensor signals 228 and camera image signals 236 from sensors 224 and cameras 232, respectively, within each building 116. For example, the signals 132 may determine a current location of a moving entity 124 outside the building(s) 116, while sensor signals 228 and camera image signals 236 are used to determine a location of a moving entity 104 within the building 116 with respect to elevations 204, 208 and building zones 212, 216.

FIG. 3 schematically shows a first device 120 block diagram in accordance with illustrative embodiments of the invention. As shown in FIG. 3, the first device 120 may include a controller 304. The controller 304 may include any combination of processing units or processors and may execute one or more stored programs or applications 332 in one or more accessible memory devices 308. The controller 304 may include conventional microprocessors or microcontrollers, application-specific integrated circuits (ASICs), programmable logic devices (PLDs), field-programmable logic devices (FPLDs), field-programmable gate arrays (FP-GAs), and/or any combination of hardware, firmware, and/or software.

The first device 120 may require a power source (not shown) to provide operating power to the electronic devices of the first device 120. The power source may include various forms of batteries or integrated compact solar panels known in the art and in some embodiments may provide various forms of external charging/recharging and battery replacement.

The first device 120 may include various forms of user controls 316, including but not limited to controls to power the first device on or off 360, reset the first device 364, program a boundary 368, and program forms of a warning or correction 372 (e.g., low volume audible tone on warning, higher volume audible tone on mild correction, mild shock on more serious or repeated corrections). The controller 304 may receive the various user controls 316 and take appropriate actions.

The first device 120 may include a GNSS or other form of location receiver (e.g., GPS) that receives location coordinates that correspond to a current location of the first device 120. Although a GNSS receiver 320 is shown in FIG. 3, any form of location coordinate reporting receiver may be used in lieu of or in addition to the GNSS receiver 320. For example, the first device 120 may include a triple constellation concurrent GNSS receiver and an Attitude and Heading Reference System (AHRS: 3-axis gyroscope, 3-axis accelerometer, and 3-axis magnetometer). The GNSS receiver is a quadruple band receiver that is capable of tracking four (4) constellations concurrently: GPS, GLONASS, Beidou, and GALILEO. This provides the GNSS receiver 320 with a good opportunity to lock onto as many satellite vehicles as possible. This approach reduces certain GNSS errors as it pertains to number of satellites in view (satellite vehicles above a cutoff elevation angle), improved Geometric Dilution of Precision (GDOP), and specifically access to GALILEO, which offers improved Circular Error Probable (CEP) over GPS, Beidou, and GLONASS. In one embodiment, range residuals may be used to improve the accuracy of coordinates 344 by techniques known in the art.

Undesirably, having a home zone or building 116 may not be enough to overcome GNSS drift (error) by itself. It may be more precise to combine home zone (building boundary 140) detection with signal 132 levels from the first devices 120 to determine if the moving entity 104 is inside the building 116. By doing this, the system 100 may have two key types of information to determine if the moving entity 104 is truly in the building 116: Is the moving entity 104 inside the building 116? If yes, what is the signal level 132? If 1) is true (i.e., the moving entity 104 is inside the building 116) and 2) the signal 132 emitted by the first device 120 is below a prescribed threshold level, then the system 100 may consider the moving entity 104 to be inside the building 116. As such, the containment function may be disabled and the moving entity 104 may not be provided any feedback/correction within the building 116. Having these two checks ensures that the GNSS drift does not inadvertently consider the moving entity 104 to be within the building 116 when the moving entity 104 is not, even if the signal 132 happened to be strong. This also ensures that the moving entity 104 does not become corrected while in the building 116 but near a window, on a deck, or in some other area that does not appreciably mitigate/reduce the amplitude of the signal 132 from the first device 120. This technique may also be useful for virtual fences along heavy tree lines or other structures. If there are no building boundaries 140 in those areas, then despite a reduction in signal 132 amplitude, the first device's 120 GNSS system maintains its full sensitivity to contain a moving entity 104.

In another embodiment, the first device 120 may utilize a "ray casting" technique to locate a moving entity 104. Ray casting is the methodological basis for 3D CAD/CAM solid modeling and image rendering. Virtual light rays are "cast" or "traced" on their path from a focal point of a camera through each pixel in the camera sensor to determine what is visible along the ray in a 3D scene.

For example, using this technique, logic may virtually cast a ray from the moving entity 104. If the ray crosses an odd number of borders or virtual fences, then the moving entity 104 is considered in the outer zone 108. If the ray crosses an even number of virtual fences (not including the building 116) then the moving entity 104 may be considered to be in a restricted area (e.g., in an inner zone 112 or outside the outer zone 108). Indeed, this technique is but one of a plurality that can be used to determine the location of the moving entity 104.

In one embodiment, the first device 120 may include a display 328 to show status messages, menus, and/or selections 348. For example, the display 328 may show various steps of configuring a boundary 128, 136, 140, an error condition, a current power level, a remaining power level, etc. The display 328 may include a number of simple on/off indicators such as light-emitting diodes (LEDs), an alphanumeric display such as a small LCD panel, or a combination of LEDs with an alphanumeric display. In one embodiment, an alphanumeric display may include touchscreen functionality to allow navigation and menu item selection.

In one embodiment, the first device 120 may include one or more control/warning transducers 324. Control/warning transducers 324 may include an audio speaker and provide various forms of stimulus to a wearing moving entity 104, as directed by received corrections and warnings 356. The stimulus may include one or more audio tones, vibrations, and/or mild shocks that are not intended to injure the moving entity 104. The duration and/or intensity of the stimulus may be programmable within the first device 120 or the second device 124, and may depend on the type of moving entity 104 the first device 120 is coupled to, such as a small dog, a large dog, a cat, a human, a goat, an alpaca, etc.

In one embodiment, the first device 120 may emit one form of feedback as the moving entity 104 approaches a boundary 128, 136, 140. If the first device 120 crosses the boundary, the first device 120 may emit a static correction or other prescribed correction (e.g., the same audible sound or a louder sound). With all of these types of feedback, the moving entity 104 may be trained to turn around to avoid hearing or feeling the feedback.

The first device 120 may include one or more radio frequency (RF) transceivers 312, which allow the first device 120 to communicate wirelessly with other wireless devices, including an RF transceiver 412 in the second device 124 as shown in FIG. 4. The RF transceiver 312 may include Wi-Fi devices that communicate with a wireless router or other device. The RF transceiver 312 may also communicate over Bluetooth, cellular, or other types of wireless communication networks. For example, the first device 120 may include a Bluetooth Low Energy (BLE) module for communication with a fob (or, alternatively, a smart phone), which a system operator may use during training of the moving entity 104 to issue corrections. The fob/smart phone may transmit signals which are received by the RF transceiver 312 and the controller 304, which communicates with control/warning transducers 324 to issue audible corrections via a speaker unit and tactile corrections via a static circuit for containment and behavioral reinforcement.

The controller 304 may transmit notifications 352 and receive corrections and warnings 356 through the RF transceiver 312. The notifications 352 may be transmitted to the second device 124 in response to the first device 120 determines a boundary 128, 136, 140 has been approached or crossed. The notifications 352 may each include an identity 336, a current time stamp, a current location coordinate 344, and identification of the type of boundary that was approached or crossed (e.g., outer zone boundary 128, inner zone C boundary 136C, building boundary 140).

In one embodiment, each first device 120 may include a unique identity 336 that may be different for each first device 120. In another embodiment, the identity 336 stored in the memory 308 may reflect a type of animal wearing the first device 120 (e.g., an identity of 336A for dogs, an identity of 336B for cats, an identity of 336C for horses, an identity of 336D for cows, etc.). In another embodiment, the identity 336 stored in the memory 308 may reflect a level of domestication for animals (e.g., an identity of 336A for cats, an identity of 336B for dogs allowed to be in a house, an identity of 336C for dogs not allowed to be in a house, etc.). In another embodiment, the identity 336 stored in the memory 308 may reflect a health for animals at an animal hospital (e.g., an identity of 336A for healthy animals allowed to be around other animals, an identity of 336B for injured animals, and an identity of 336C for sick animals that must be isolated). In another embodiment, the identity stored in the memory 308 may reflect a level of aggressiveness or danger in animals (e.g., an identity of 336A for friendly cats and dogs that are not aggressive to other cats, dogs, or humans, an identity of 336B for aggressive cats and dogs that sometimes fight other animals or do not want to be handled by humans, an identity of 336C for dangerous animals that may consume other animals, etc.).

In one embodiment, the identity 336 for each first device 120 includes two parts: the identity 336 as explained above, and a serial number unique to each first device 120. The serial number allows each individual first device 120 to be individually addressed such that a received correction or warning 356 affects only one moving entity 104 wearing a specific first device 120. For example, the controller 304 may ignore received corrections and warnings 356 that include a serial number that does not match the stored serial number in the identity 336.

In one embodiment, the memory 308 may include a log of received coordinates 340. The log 340 may include a time stamp for each received coordinate 340. In one embodiment, the coordinates log 340 may be of a fixed size and may only be capable of storing a predetermined number of logs 340. In one embodiment, once the log 340 is full, the controller 304 may delete an oldest entry in the log 340 when a new coordinate 344 is received. In this way, a recent movement history for the moving entity 104 may be maintained.

In one embodiment, the memory 308 may store boundaries of the outer zone 128, inner zone boundaries 136, and building boundaries 140. In one embodiment, the memory 308 may store inner zone boundaries 136 that correspond only to the moving entity 104 (e.g., inner zone boundaries 136B for moving entity 104B). When the controller 304 receives a new coordinate 344, the controller 344 may compare the received coordinate 344 to the stored outer zone boundaries 128, the stored inner zone boundaries 136, and the stored building boundaries 140. If a match is found, in one embodiment the controller 304 may assemble and transmit a notification 352 to the second device 124. The notification 352 may include the matched coordinate 344, a time stamp, and an indication of which boundary 128. 136, 140 was matched. By performing the coordinate 344 comparison and matching within the first device 120, the number of transmitted notifications 352 may be greatly reduced compared to sending every received coordinate 344 to the second device 124. This may beneficially increase operating time of the first device 120 by significantly reducing transmitted notifications 352 and thereby power consumption since transmit power is one of the greatest drains on power.

FIG. 4 schematically shows a second device 124 block diagram in accordance with illustrative embodiments of the invention. The second device 124 may include any form of computing device, including a server, a desktop computer, a laptop or notebook, a tablet computer, a pad computer, a smart phone, a wearable computer, or an embedded computer.

As shown in FIG. 4, the second device 124 may include a controller 404. The controller 404 may include any combination of processing units or processors and may execute one or more stored programs or applications 432 in one or more accessible memory devices 408. The controller 404 may include conventional microprocessors or microcontrollers, application-specific integrated circuits (ASICs), programmable logic devices (PLDs), field-programmable logic devices (FPLDs), field-programmable gate arrays (FPGAs), and/or any combination of hardware, firmware, and/or software. The second device 124 may require a power source (not shown) to provide operating power to the electronic devices of the second device 124. The second device 124 may also include a display 416 to view locations of moving entities 104, such as on a map 420, configure permissions, view camera 232 and/or sensor 224 video, and the like. The display 416 may typically be a monitor or other display 416 type that allows presentation of text and graphics.

The second device 124 may include one or more radio frequency (RF) transceivers 412, which allow the second device 124 to communicate wirelessly with other wireless devices, including an RF transceiver 312 in the first devices 120. The RF transceiver 412 may include Wi-Fi devices that communicate with a wireless router or other device. The RF transceiver 412 may also communicate over Bluetooth, cellular, or other types of wireless communication networks. The controller 404 may receive notifications 352 from first devices 120 and transmit corrections and warnings 356 through the RF transceiver 412 to the first devices 120. The corrections and warnings 356 may include a serial number of a specific first device 120 the correction or warning 356 is directed to.

The notifications 352 may be received from the first devices 120 in response to the first devices 120 determine a boundary 128, 136, 140 has been approached or crossed. The notifications 352 may each include an identity 336, a current time stamp, a current location coordinate 344, and identification of the type of boundary that was approached or crossed (e.g., outer zone boundary 128, inner zone C boundary 136C, building boundary 140). In addition to receiving the notifications 352, the RF transceiver 412 may also receive camera images and sensor data 424 from sensor signals 228 and camera image signals 236 from the building 116.

The memory device 408 includes one or more applications 432. One application 432 may perform object recognition based on received camera images and sensor data 424 to identify moving entities 104 and locations within a building 116. Another application 432 may receive notifications 352 from first devices 120 and parse the data within the notifications 352 for an identity 336 (including serial number), a position coordinate 344, a time stamp, and an indication of a type of boundary 128,136,140 that has been approached or crossed. Another application 432 may determine whether a warning or correction should be sent to a first entity 120. For example, a warning (e.g., low volume audio tone) may be more appropriate when a boundary 128, 136, 140 is approached (to an area that is not allowed to the moving entity 104) or a moving entity 104 is in/on a passageway 220 (proceeding to a building elevation or building zone that is not allowed to the moving entity 104). A correction (e.g., higher volume audio tone, vibration, or mild shock) may be more appropriate when a boundary 128, 136, 140 is crossed (to an area that is not allowed to the moving entity 104) or a moving entity 104 is in a building elevation or building zone that is not allowed to the moving entity 104).

In one embodiment, the memory device 408 may also include a notification log 428. In one embodiment, the notification log 428 may be a variable and expanding size to store all received notifications 352. In another embodiment, the notification log 428 may be fixed in size such that when full, an oldest notification 352 is deleted prior to adding a just-received notification 352 to the notification log 428.

When notifications 352 are received from a first device 120, the notifications 352 may be stored to the notification log 428 only if the identity 336 is recognized by the controller 404. For example, neighboring properties to the outer zone 108 may have other moving entities 104 with different identities 336. It would not be practical to track those additional moving entities 104 unless that was desired. In one embodiment, the notifications 352 stored in the notification log 428 may be organized by identity 336 or moving entity 104. In one embodiment, the notifications 352 stored in the notification log 428 may be organized or sub-organized (i.e., after organizing by identity 336 or moving entity 104) by time stamps.

In one embodiment, the memory 408 may include a moving entity permissions data structure 436. The moving entity permissions data structure 436 may include permissions for each moving entity 104 relative to the outer zone 108, one or more inner zones 112, and each building 116. The data structure 436 and an example use case is shown and described in FIG. 5.

In one embodiment, when the second device 124 receives a notification 352 of a moving entity 104 moving outside the outer zone 108, the controller 404 may instantiate a push notification to one or more smart phones (e.g., smart phones associated with home or business owners associated with the property and/or building(s) 116). In one embodiment, there may be a plurality of keep out zones (e.g., outside the outer zone 108, one or more inner zones 112, etc.) drawn and saved on the smart phone and the same notifications 352 may apply to each. If one of the keep out zones is large, the smart phone owner may even track the moving entity 104 within the keep out zone. If the moving entity 104 should leave the keep out zone, the smart phone would be notified of that as well. The same schema works here as it does with the outer zone 108; meaning, the first device 120 emits the tones and vibration leading up to the keep out zone. After the moving entity 104 enters the keep out zone, then a static correction or other correction (e.g., longer duration, higher intensity) may be applied.

FIG. 5 schematically shows a moving entity permissions diagram in accordance with illustrative embodiments of the invention. Moving entity permissions 436 are a key aspect of mobile entity management that, following configuration, determine how corrections and warnings 356 are provided to first devices 120 and moving entities 104. FIG. 5 illustrates an example of a moving entities data structure 436 that includes four moving entities 104, identified as moving entity 104A-104D. Moving entities 104A and 104B may represent typical partially or fully domesticated animals such as dogs. Moving entity 104C may represent a typical non-domesticated animal such as a horse. Moving entity 104D may represent a visiting domesticated animal at a veterinary clinic or kennel.

The moving entity permissions 436 have been configured assuming inner zone A 112A represents a feeding/resting area for moving entity 104A, inner zone B represents a feeding/resting area for moving entity 104B, and inner zone C represents a driveway or parking area for the building 116. The building 116 includes a zone 1 524 that may represent a kennel or a veterinary treatment area, zone 2 528 may represent a lower floor of the building 116 (i.e., a first elevation 204) that includes community living areas, and zone 3 532 may represent an upper floor of the building 116 (i.e., a second elevation 208) that includes bedrooms and bathrooms.

Although not shown in FIG. 5, in one embodiment the moving entity permissions 436 may include a correction or warning intensity and duration for each moving entity 104. For example, larger animals may require a higher intensity and/or longer duration of a correction or warning than smaller animals.

After a predetermined time and/or distance has elapsed after the outer boundary 128 has been crossed, the first device 120 may transition into a tracking mode and issue an alert to the second device 124 or a cloud server and subsequently update the second device 124 at regular intervals advising that the moving entity 104 has escaped the outer zone 108. As long as the moving entity 104 is in the out of bounds zone (i.e., outside the outer zone boundary 128), the first device 120 preferably will issue continual updates to the second device 124 or cloud server and subsequently update the second device 124 with current location information (e.g., coordinates 344). From the cloud server or the first device 120, additional information (e.g., the moving entity's 104 name, the moving entity's 104 location, a "bread crumb trail" of the moving entity 104, whether the moving entity 104 is moving or not moving, distance from the outer zone 108, a time stamp the moving entity 104 left the outer zone 108, and directions to the moving entity's 104 then-current location) may be provided.

In one embodiment, if the moving entity 104 is outside the outer zone 108 and re-enters the outer zone 108, the first device 120 may not issue another static correction and the moving entity 104 may be allowed to safely re-enter the outer zone 108 and the first device 120 will re-enter the normal tracking mode of operation. In one embodiment, another notification 352 may be sent to the second device 124 indicating that the moving entity 104 has safely returned to within the outer zone 108.

Referring to moving entity 104A, permissions are allowed to the outer zone 504, inner zone A 508, and all of the building zones 520 (i.e., building zone 1 524, building zone 2 528, and building zone 3 532). Access is not allowed outside the outer zone 504, or to inner zone B 512 or inner zone C 516.

Referring to moving entity 104B, permissions are allowed to the outer zone 504, inner zone B 512, building zone 1 524, and building zone 2 528. Access is not allowed outside the outer zone 504, to inner zone A 508, to inner zone C 516, or to building zone 3 532.

Referring to moving entity 104C, permissions are allowed only to the outer zone 504. Access is not allowed outside the outer zone 504, to inner zone A 508, to inner zone B 512, to inner zone C 516, and all of building zones 520 (i.e., building zone 1 524, building zone 2 528, and building zone 3 532).

Referring to moving entity 104D, permissions are allowed to the outer zone 504, inner zone C 516, and building zone 1 524. Access is not allowed outside the outer zone 504, to inner zone A 508, to inner zone B 512, to building zone 2 528, and to building zone 3 532.

FIG. 6 shows a flowchart of a moving entity configuration process 600 in accordance with illustrative embodiments of the invention. It should be noted that some of the steps may be performed in a different order than that shown, or at the same time. Those skilled in the art therefore can modify the process as appropriate.

The process begins at block 604, in which the outer zone boundary 128 is determined. For example, in one embodiment an individual may walk the outer zone boundary 128 while activating various user controls 316 on a first device 120 from an outer zone 108 starting point, through various corners or waypoints, and returning to the outer zone 108 starting point. At the conclusion of walking the outer zone 108, one or more user controls 316 may be activated to save the outer zone boundary 128 to the memory 308 of the first device 120 and/or transmit a notification 352 to the second device 124 containing the outer zone boundary 128. Flow proceeds to block 608.

At block 608, the inner zone boundaries 136 are determined for each inner zone 112. For example, (for each inner zone 112) in one embodiment an individual may walk the inner zone boundaries 136 while activating various user controls 316 on a first device 120 from an inner zone 112 starting point, through various corners or waypoints, and returning to the inner zone 112 starting point. At the conclusion of walking the inner zone 112, one or more user controls 316 may be activated to save the inner zone boundary 136 to the memory 308 of the first device 120 and/or transmit a notification 352 to the second device 124 containing the inner zone boundary 136. This step may be repeated for each inner zone 112. Flow proceeds to block 612.

At block 612, building boundaries 140 are determined for each building 116. For example, (for each building 116) in one embodiment an individual may walk the building boundaries 140 while activating various user controls 316 on the first device 120 from building 116 starting point (e.g., typically at a corner of the building 116), through various corners or waypoints, and returning to the building 116 starting point. At the conclusion of walking the perimeter of the building 116, one or more user controls 316 may be activated to save the building boundary 140 to the memory 308 of the first device 120 and/or transmit a notification 352 to the second device 124 containing the building boundary 140. Flow proceeds to block 616.

At block 616, the first device 120 may be configured with the outer zone boundary 128, inner zone boundary/boundaries 136, and building boundary/boundaries 140. Once the identity 336 of the moving entity 104 and all three types of boundaries 128, 136, 140 have been saved to the memory 308 of the first device 120, the first device 120 has been configured. Flow proceeds to block 620.

At block 620, the elevations 204, 208, building zones 212, 216, etc. and passageways 220 within each building 116 are determined, and sensors/cameras 224, 232 for each elevation 204, 208, building zone 212, 216, etc. and passageway 220 are identified. In one embodiment, the locations and capabilities of sensors 224 and cameras 232 may determine the number and sizes of zones 212, 216 within each elevation 204, 208 of building 116. Flow proceeds to block 624.

At block 624, the moving entity permissions 536 are configured for each moving entity 104 on the second device 124. The moving entity permissions 536 may be based on the outer zone 108, the inner zone(s) 112, and the building(s) 116 and building zones 520. Once this step has been completed, the system 100 is configured. Flow proceeds to block 628.

At block 628, system operation is enabled and the mobile entity management system is operating. Flow ends at block 628.

FIG. 7 shows a flowchart of a moving entity management process 700 in accordance with illustrative embodiments of the invention. It should be noted that some of the steps may be performed in a different order than that shown, or at the same time. Those skilled in the art therefore can modify the process as appropriate.

The process begins at block 704, in which a controller 304 and/or 404 may form an outer zone 108, including a building 116. Formation of an outer zone 108 is described with reference to FIGS. 3 and 6. Flow proceeds to block 708.

At block 708, the controller 304 and/or 404 may form one or more inner zones 112 within the outer zone 108. Formation of one or more inner zones 112 is described with reference to FIGS. 3 and 6. Flow proceeds to block 712.

At block 712, the controller 404 monitors a signal 132 from the moving entity 104. The signal 132 communicates an identity 336 of the moving entity 104, a time stamp, and a boundary approach or intersection with the outer zone 108, an inner zone 112, or a building 116. Flow proceeds to block 716.

At block 716, the controller 404 monitors a location of the moving entity 104. The location outside the building(s) 116 may be provided by a position locating system such as GPS or GNSS and received notifications 352. The location within the building(s) 116 may be provided by one or more sensors 224 or cameras 232 within the building(s) 116. Flow proceeds to block 720.

At block 720, the controller 404 provides a correction 356 to the moving entity 104, in response to the moving entity 104 crosses a boundary 128, 136, 140 to a non-allowed outside area or a non-allowed building zone 212, 216. In another embodiment, the controller 404 may provide a warning to the moving entity 104 in response to the moving entity 104 approaches a boundary 128, 136, 140 to a non-allowed outside area is in a passageway 220 of the building 116 and heading to a non-allowed building zone 212, 216. Flow ends at block 720.

Various embodiments of the invention have been described in fulfillment of the various objectives of the invention. It should be recognized that these embodiments are merely illustrative of the principles of the present invention. Numerous modifications and adaptions thereof will be readily apparent to those skilled in the art without departing from the spirit and scope of the present invention as defined in the following claims.

What is claimed is:

1. A method for managing a moving entity, comprising:
forming an outer zone including a building;
forming an inner zone within the outer zone;
monitoring a signal from the moving entity, the signal comprising an identity of the moving entity and a signal strength;
monitoring a location of the moving entity; and
correcting the moving entity based on the signal strength, the identity, and a location of the moving entity relative to the outer and inner zones and the building.

2. The method of claim 1, wherein correcting the moving entity based on the location of the moving entity relative to the building comprises:
determining the moving entity is within the building;
determining an elevation of the moving entity; and
providing the correction to the moving entity in response to a combination of the elevation and identity of the moving entity are prohibited.

3. The method of claim 2, further comprising:
removing the correction from the moving entity in response to the combination of the elevation and the identity are not prohibited.

4. The method of claim 1, further comprising:
determining the location of the moving entity relative to the outer and inner zones based on a satellite signal received by the moving entity; and
determining the location of the moving entity relative to the building at least in part from one or more cameras or sensors within the building.

5. The method of claim 1, wherein the inner zone includes a first and a second inner zone and the moving entity includes a first and second moving entity differentiated by identity, wherein the first moving entity is allowed in the first inner zone but not the second inner zone, wherein the second moving entity is allowed in the second inner zone but not the first inner zone, wherein the method further comprises:
determining the identities and locations of the first and the second moving entities;
correcting the first moving entity in response to the first moving entity is in the second inner zone; and
correcting the second moving entity in response to the second moving entity is in the first inner zone.

6. The method of claim 1, wherein the building comprises a first and a second building zone, wherein the moving entity is allowed in the first building zone but not the second building zone, wherein the method further comprises:
correcting the moving entity in response to the moving entity is in the second building zone.

7. The method of claim 1, wherein the building includes a first elevation and a second elevation, wherein the second elevation includes a first and a second building zone, wherein the moving entity is allowed on the first elevation or in the first building zone but not on the second elevation and in the second building zone, wherein the method further comprises:

determining an elevation of the moving entity within the building; and
correcting the moving entity in response to determining the moving entity is on the second elevation and in the second building zone.

8. The method of claim 7, wherein the building comprises a passageway connecting the first and second elevations, wherein the method further comprises:
determining the moving entity has entered the passageway from the first elevation, and in response:
providing a warning to the moving entity, wherein the warning has a lower intensity than correcting the moving entity.

9. The method of claim 1, wherein correcting the moving entity is based on the identity of the moving entity.

10. The method of claim 1, wherein the signal strength is based on a carrier-to-noise ratio of the signal.

11. The method of claim 1, wherein one or more boundaries of the building cross a boundary of the outer zone or the inner zone, wherein in response to the moving entity is within the building the method further comprises:
correcting the moving entity based on the signal strength, the identity, and the location of the moving entity relative to the building, but not the outer and inner zones.

12. A system, comprising:
a first device associated with a moving entity, comprising:
a first memory device, configured to store an identity associated with the first device, boundaries of an outer zone, boundaries of an inner zone within the outer zone, and boundaries of a building within the outer zone;
a Global Navigation Satellite System (GNSS) receiver, configured to produce current coordinates of the first device;
a first Radio Frequency (RF) transceiver; and
a first processor, coupled to the first memory device, the GNSS receiver, and the RF transceiver, configured to transmit notifications through the RF transceiver in response to the first device crosses one or more boundaries of the outer zone, the inner zone, or the building, the notifications including the identity, a location of the first device, and an indication of the one or more boundaries crossed;
a second device associated with the building, comprising:
a second memory device;
a second RF transceiver, configured to receive the notifications from the first RF transceiver; and
a second processor, coupled to the second memory device and the second RF transceiver, configured to:
determine a signal strength of the notifications;
extract the identity, the location, and the indication of the one or more boundaries crossed from the notifications; and
correct the moving entity based on the signal strength, the identity, the location, and the indication of the one or more boundaries crossed.

13. The system of claim 12, wherein the second processor configured to correct the moving entity comprises the second processor configured to transmit a correction notification through the second RF transceiver to the first RF transceiver and the first device applies a correction to the moving entity.

14. The system of claim 12, wherein the second processor configured to correct the moving entity based on the location of the moving entity relative to the building comprises:

in response to receiving the notification from the first device:

determining, from one or more cameras or sensors within the building, an elevation of the moving entity within the building;

determining a combination of the elevation and identity of the moving entity are prohibited; and transmitting the correction to the first device.

15. The system of claim 14, wherein the second processor is configured to remove the correction to the moving entity in response to the combination of the elevation and the identity are not prohibited.

16. The system of claim 12, wherein the inner zone includes a first and a second inner zone and the moving entity includes a first and a second moving entity differentiated by identity, wherein the first moving entity is allowed in the first inner zone but not the second inner zone, wherein the second moving entity is allowed in the second inner zone but not the first inner zone, wherein the second processor is configured to:

receive notifications from the first and the second moving entities;

determine the identities and locations of the first and the second moving entities;

transmit a correction to the first moving entity in response to the second processor determines the first moving entity is in the second inner zone; and transmit a correction to the second moving entity in response to the second processor determines the second moving entity is in the first inner zone.

17. The system of claim 12, wherein the building comprises a first and a second building zone, wherein the moving entity is allowed in the first building zone but not the second building zone, wherein the second processor is configured to:

transmit a correction to the first device in response to the second processor determines the moving entity is in the second building zone.

18. The system of claim 12, wherein the building includes a first elevation and a second elevation, wherein the second elevation includes a first and a second building zone, wherein the moving entity is allowed on the first elevation or in the first building zone but not on the second elevation and in the second building zone, wherein the second processor is configured to:

determine an elevation of the moving entity within the building; and transmit a correction to the first device in response to the second processor determines the moving entity is on the second elevation and in the second building zone.

19. The system of claim 18, wherein the building comprises a passageway that connects the first and second elevations, wherein the second processor is configured to:

determine the moving entity has entered the passageway from the first elevation, and in response:

transmit a warning to the first device, wherein the warning has a lower intensity than an intensity used to correct the moving entity.

20. The system of claim 12, wherein the second processor corrects the moving entity is based on the identity of the moving entity.

21. The system of claim 12, wherein the signal strength is based on a carrier-to-noise ratio of the notifications.

22. The system of claim 12, wherein one or more boundaries of the building cross a boundary of the outer zone or the inner zone, wherein in response to the moving entity is within the building, the second processor is configured to:

correct the moving entity based on the signal strength, the identity, and the location of the moving entity relative to the building, but not the outer and inner zones.

* * * * *